US008505235B2

(12) United States Patent
Rich et al.

(10) Patent No.: US 8,505,235 B2
(45) Date of Patent: **\*Aug. 13, 2013**

(54) CPU-CONTROLLED, REAMING ELECTRONIC ANIMAL TRAP WITH THREE-KILLING-PLATE CONFIGURATION

(75) Inventors: Christopher T. Rich, Leola, PA (US); Larry L. Harman, Abbottstown, PA (US); David L. Anderson, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,182

(22) Filed: Jul. 26, 2011

(65) Prior Publication Data

US 2012/0124887 A1    May 24, 2012

Related U.S. Application Data

(63) Continuation of application No. 12/926,825, filed on Dec. 10, 2010, now abandoned, which is a continuation of application No. 12/318,149, filed on Dec. 22, 2008, now abandoned, which is a continuation of application No. 11/785,661, filed on Apr. 19, 2007, now abandoned, which is a continuation of application No. 10/931,044, filed on Sep. 1, 2004, now Pat. No. 7,219,466.

(60) Provisional application No. 60/499,371, filed on Sep. 3, 2003.

(51) Int. Cl.
*A01M 19/00* (2006.01)
*A01M 23/38* (2006.01)

(52) U.S. Cl.
USPC .................................................. 43/98; 43/99

(58) Field of Classification Search
USPC ............................................ 43/73, 76, 98, 99
See application file for complete search history.

(56) References Cited

U.S. PATENT DOCUMENTS

| | | | | |
|---|---|---|---|---|
| 909,814 | A * | 1/1909 | Norris | 43/98 |
| 1,062,126 | A * | 5/1913 | Smith | 43/99 |
| 2,595,130 | A * | 4/1952 | Edwards | 43/77 |
| 3,827,176 | A * | 8/1974 | Stirewalt | 43/98 |
| 4,048,746 | A * | 9/1977 | Dye | 43/98 |
| 5,949,636 | A * | 9/1999 | Johnson et al. | 361/232 |
| 2004/0020100 | A1 * | 2/2004 | O'Brien et al. | 43/1 |

* cited by examiner

*Primary Examiner* — David Parsley
(74) *Attorney, Agent, or Firm* — Jacobson Holman PLLC

(57) ABSTRACT

An electronic animal trap with a CPU-controlled, rearming, three-killing-plate configuration and extended killing cycle for trapping and exterminating larger rodents such as rats. The high-voltage output circuit is connected to a pair of killing plates which are activated with a high-voltage pulse train for a killing cycle when a pest of known impedance is sensed across the pair of plates. A third killing plate, electrically coupled to a first plate of the pair of plates, is brought to the voltage level of the first plate within approximately 1 msec of circuit activation for increased kill and escape-prevention capabilities.

16 Claims, 5 Drawing Sheets

CPU-CONTROLLED, REAMING ELECTRONIC ANIMAL TRAP WITH THREE-KILLING-PLATE CONFIGURATION

This is a continuation application of U.S. Ser. No. 12/926,825, filed Dec. 10, 2010 now abandoned, which was a continuation application of Ser. No. 12/318,149, filed Dec. 22, 2008 now abandoned, which was a continuation application of U.S. Ser. No. 11/785,661, filed Apr. 19, 2007 now abandoned, which was a continuation application of U.S. Ser. No. 10/931,044, filed Sep. 1, 2004 now U.S. Pat. No. 7,219,466, which claimed the priority of Provisional application Ser. No. 60/499,371 filed Sep. 3, 2003, and hereby claims the priority thereof to which it is entitled.

BACKGROUND OF THE INVENTION

1. Field of the Invention

The invention relates to electric or electronic animal traps, and relates more particularly to an animal trap adapted to catch and electrocute a targeted animal, and also to rearm in the event the continuing presence of the animal is not detected upon completion of a killing cycle.

2. The Prior Art

A number of animal traps have been developed which include structural devices to trap an animal and prevent its escape, along with electric or electronic components which act to kill the trapped animal.

One such device is found in U.S. Pat. No. 6,609,328 ("the '328 patent"), which is hereby incorporated by reference in its entirety. The trap disclosed in the '328 patent is virtually escape-proof, electrocuting the animal while also providing a visual indicator signaling when the trap has initiated a kill cycle and thereafter requires servicing to remove an electrocuted animal.

Other trap designs that have effectively prevented pest-escape in the prior art are set forth U.S. Pat. No. 6,735,899 ("the '899 patent"), which is hereby incorporated by reference in its entirety. The diverter traps disclosed in the '899 patent utilize at least two fixed barriers or diverter members that are positioned between the opening of the trap and a pair of spaced charge plates electrically connected to a voltage source. The two charge plates are configured such that contact with both charge plates simultaneously by a target animal will actuate the electric charge to effectively kill the animal.

While these traps may be used effectively with smaller rodents and insects, a problem still exists with larger pests such as rats in that, while the trap may have been triggered by an animal so as to initiate the kill cycle and subsequent entry into a standby mode requiring service to reset the trap, larger vermin may not have been able to fit into the trap or, if subjected to the voltage, may not have been killed and may have escaped. As a result, since the standby mode indicates the presence of a dead pest, because it was in fact initiated by a false trigger, wasted effort is expended by exterminator personnel or other users in servicing and resetting a trap which is, in fact, already empty.

Another trap design is shown in GB 2,354,693, in which three electrical terminals and two power units are incorporated for electrocution of a rodent within a tubular trap having two entrances. Depending upon which side the rodent uses to enter, the power unit on that side activates the center terminal and the proximal side terminal. In that the distal side terminal is not activated, it provides no benefit in terms of increased voltage delivery capacity.

Therefore, a need exists for a trap that combines an electronic circuit having higher voltage to provide greater killing power, with a detection mechanism that is able to rearm the trap without human intervention in the event of pest escape.

SUMMARY OF THE INVENTION

In view of the foregoing, one object of the present invention is to overcome the difficulties due to false-positive indications from an electronically-controlled animal trap.

Another object of the present invention is to provide an electronically-controlled animal trap having a more powerful electrocution capability, reducing the likelihood of pest survival and escape once the trap has been activated.

A further object of the present invention is to provide an electronically-controlled animal trap that is able to detect the absence of an animal and thereafter to rearm itself multiple times without requiring human intervention.

A still further object of the present invention is to provide an electronically-controlled animal trap with reduced servicing requirements through automatic rearming in the event of animal escape.

In accordance with this and other objects, the present invention is directed to a rearming, high-voltage, electronic animal trap for killing and retaining target animals, typically larger rodents such as rats, squirrels, and chipmunks, as well as mice. The trap includes a micro-controller chip with a high voltage circuit for generating and delivering a high-voltage pulse train to a set of killing plates for an extended killing cycle. The circuit is activated through connection by a known impedance between two active plates, with a third plate being nearly simultaneously activated as a result. If, upon conclusion of the killing cycle, the impedance remains across the plates, the circuit activates a visual indicator to alert a user that the trap contains a dead rodent. If, on the other hand, the impedance increases to that of an open circuit, likely meaning the animal has escaped, the circuit automatically rearms itself and no visual indicator is initiated. The increased power of the three-killing-plate configuration, combined with the extended killing cycle, provides enhanced kill ratios when dealing with larger, more robust rodents.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The combination of elements, arrangement of parts and features of construction that lead to the rearming animal trap with three-killing-plate configuration of the instant invention will be pointed out in more detail hereinafter with respect to the accompanying drawings in which like parts are designated by like reference characters throughout the several views of the drawings, wherein.

DESCRIPTION OF THE INVENTION

Figure 1:
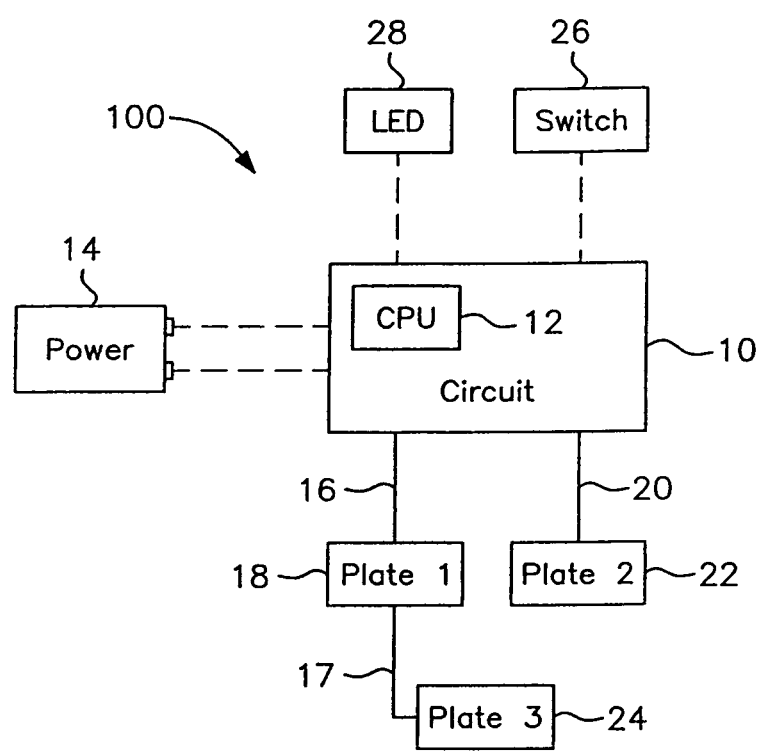
FIG. 1 a block diagram of the high-voltage, rearming circuitry with three-killing-plate configuration according to the present invention.

Although only a few preferred embodiments of the invention are explained in detail, it is to be understood that other embodiments are possible and likely. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Although the concepts of the instant invention are equally applicable to traps for animals of any size, devices of this type are primarily utilized in connection with the trapping of larger rodents such as rats and, therefore, further discussion herein will be primarily directed to this application.

FIG. 1 is a block diagram of the rearming circuit components, generally designated by the reference numeral 100, according to the present invention. The circuit components 100 include a high-voltage output circuit 10 controlled by a central processing unit (CPU) 12 and electrically connected to a power supply 14. The CPU 12 may be embodied as a standard 8-bit micro controller chip, and the high output circuit 10 can be a standard fly-back circuit.

A first electrical connection member 16, which may be embodied as a wire, receives current from the high-voltage output circuit 10 and also connects to a first killing plate 18 so that electricity can be provided thereto. A second electrical connection member 20, which may also be a wire, connects the high-voltage output circuit 10 to a second killing plate 22. The first and second killing plates 18, 22 are the active plates which trigger activation of the circuit. A third killing plate 24 is coupled to the first plate 18 by a third electrical connection member 17 and automatically goes to the voltage level of the first plate 18 when the circuit is activated. The circuit is turned on to an enabled state by a switch 26 accessible from the exterior of the trap and adjacent an LED 28 which provides the user with visual indicators of trap operating status.

Before describing the structure and operation of the rearming circuit components 100 of the present invention in detail, a representative trap embodiment within which the circuitry may be incorporated will be briefly explained in order to provide the necessary backdrop for a full understanding of the present invention.

Figure 2:
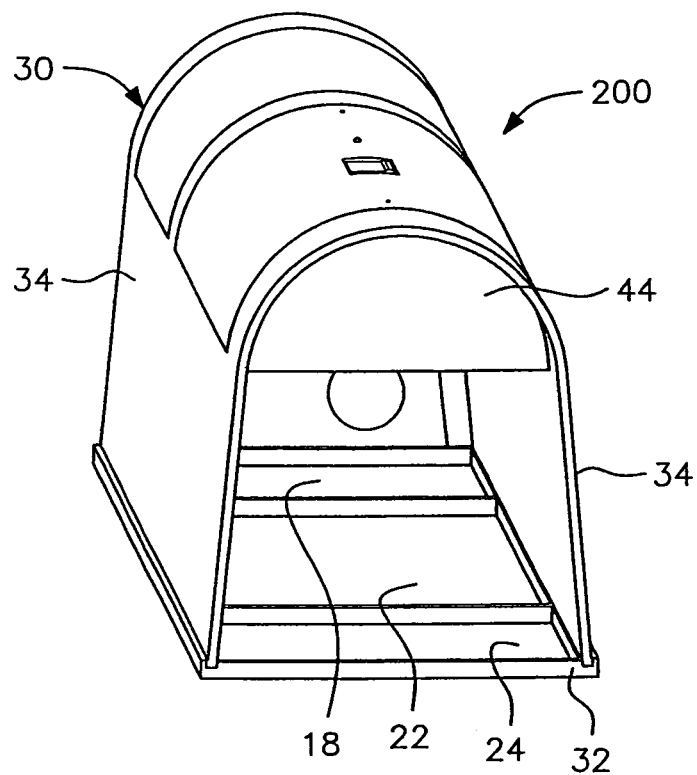
FIG. 2 is a perspective view of an embodiment of an electronic animal trap that may be used with the high-voltage rearming circuitry according to the present invention.
Figure 3:
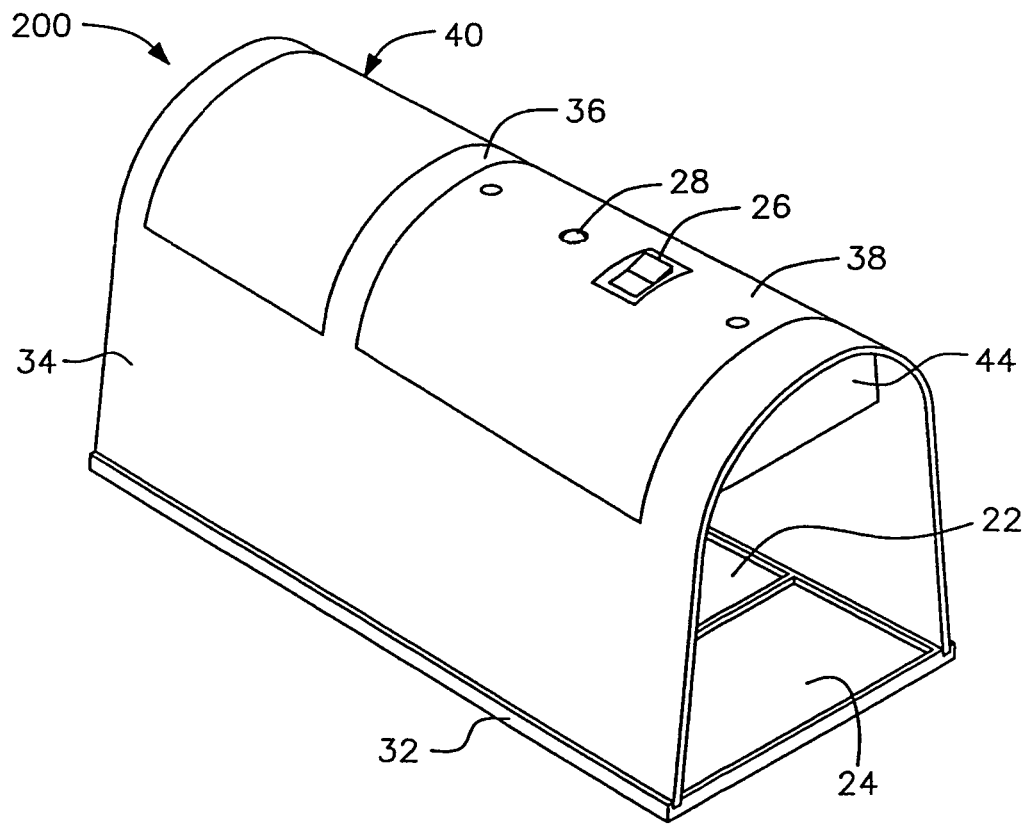
FIG. 3 is another perspective view of the animal trap embodiment of FIG. 2.

FIGS. 2 and 3 depict two perspective views of an electronic animal trap, generally designated by the reference numeral 200, which is suitable for use with the high-voltage, rearming circuitry of the present invention. Side and end views of the trap are set forth in FIGS. 4 and 5, respectively.

As shown, the housing 30 has a bottom wall 32, upstanding side walls 34, and a roof 36 provided with an electronics chamber 38 and a battery cover 40. The upper surface of the electronics chamber 38 carries the switch 26 or button that toggles from an "on" or standby position, in which the circuit may be activated, to an "off" or reset position, and the LED 28.

The LED 28 is mounted on the upper surface of the electronics chamber 38 to provide visual indications of the activity and status of the trap. The LED 28 turns "on" or flashes to provide a visual indication to the user during activation of the trap and thereafter when the trap contains a dead rat as will be more fully described hereinafter. Additional LEDs may also be included should separate indicators of differing colors be desired.

The battery cover 40 covers an area which contains the power supply 14. Of course, the assembly may be simplified by using a single cover portion for the electronics chamber and the power supply. The high-voltage output circuitry of the present invention may also be incorporated within any of the embodiments shown in the '899 patent, as well as in the '328 patent, and the present application is intended to cover all such embodiments.

With reference to FIGS. 2 and 3, the bottom wall or base 32, side walls 34, back wall 42, front overhang 44, and roof 36 together define an enclosure or killing chamber for the targeted animal. The side walls 34 define the elongated passageway leading toward the back wall 42 from the entrance opening 46 which communicates with the exterior of the housing 30.

The power supply 14 which provides power to the trap can include one or more batteries, such as two AA batteries. Alternatively, the trap may be electrically connected to a wall outlet. When embodied as a battery, the power supply 14 may be conveniently located in the power supply area under the battery cover 40. The battery cover 40 is preferably snap fitted for easy entry to replace expired batteries.

In use, the high-voltage output circuit 10 is electrically connected to the power supply 14 to convert the power to electricity. The first electrical connection member 16 receives the electricity from the high-voltage output circuit 10 and also connects to the first plate 18 near the back wall 42 so that electricity can be provided thereto. The second electrical connection member 20 connects to the second plate 22 in the middle of the trap to provide electricity to the second plate 22, while the third plate 24 at the entrance 46 to the trap is coupled to the first plate by the third electrical connection member 17.

As shown, the first, second and third plates 18, 22, are immediately adjacent to one another, but in spaced relationship. A rodent entering the trap passes over the third plate 24 and onto the second plate 22 without incident. By placing its front paws on the first plate 18 while its rear paws are still on the second plate 22, however, the advancing rodent completes the electrical circuit, allowing an electric current to flow between the first plate 18 and the second plate 22. The third plate 24, through the third electrical connection 17, is brought to the voltage level of the first plate 18 within approximately 1 ms. This forces the rodent forward toward the back wall 42 while effectively activating the entire floor area, reducing the likelihood of escape and more surely resulting in fatal electrocution of the rodent.

Figure 4:
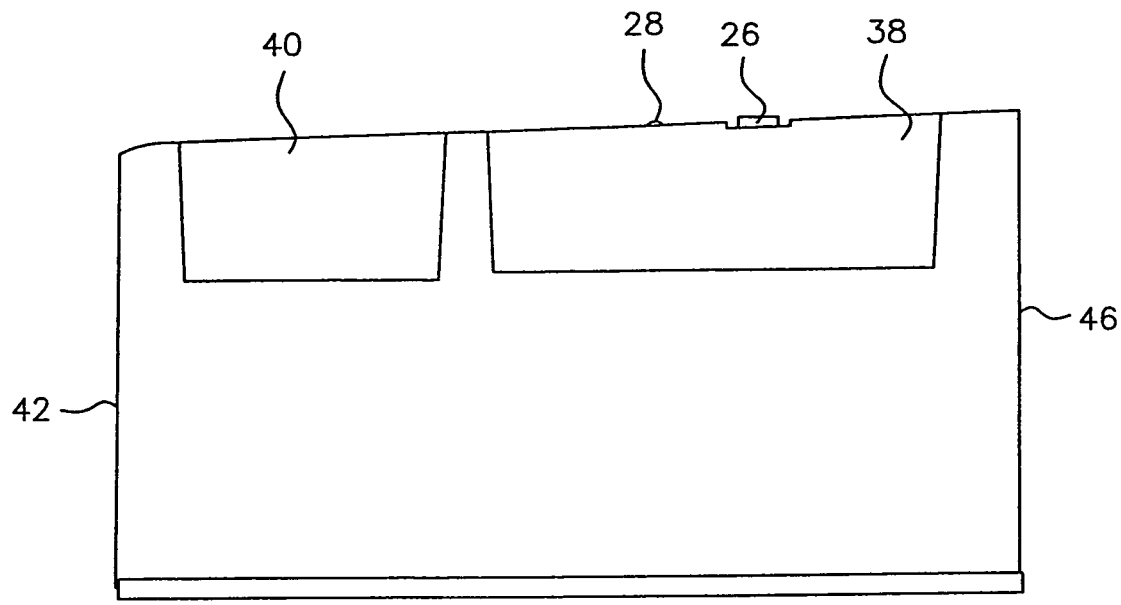
FIG. 4 is a side view of the animal trap embodiment of FIG. 2.

As shown in FIG. 4, the height of the trap decreases gradually from the entrance 46 to the back wall 42, beginning at approximately 4¹⁹⁄₃₂" and declining to a height of 4¼". This provides a more inviting approach from a rodent's perspective and also reduces the amount of space available for evasive action once inside the trap. The width of the trap may also decline from the entrance 46 to the back wall 42, again attracting rodents who prefer close spaces while limiting their maneuverability. The overall length of the trap is approximately 8½" with a width at the base of the entrance 46 of just under 4".

Figure 5:
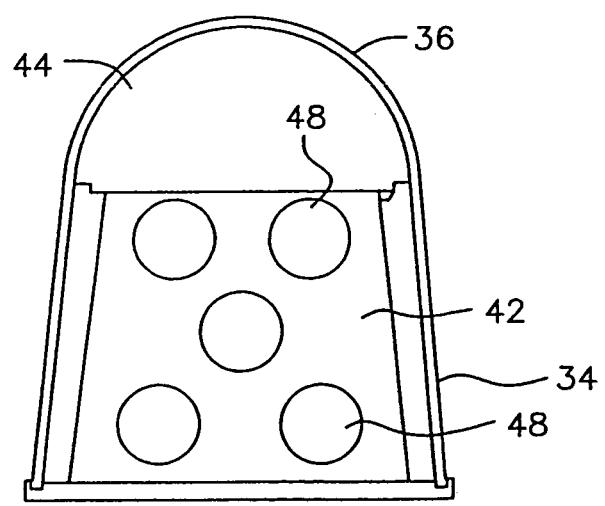
FIG. 5 is a view from the entrance end of the animal trap of FIG. 2.

As shown in FIG. 5, the back wall 42 is provided with openings 48 which allow the smell of the bait to permeate the area around the trap, while also allowing the rodent to sample the bait without entering the trap. This increases the interest of the rodent, providing positive reinforcement so as to overcome their natural tentativeness, particularly in the case of rats, concerning new places. As the confidence of the pest increases, and with the improved visibility into the trap provided by light entering the openings 48, it becomes increasingly likely that the rodent will enter the trap in order to obtain a larger portion of the bait contained therein.

The three-killing-plate configuration of the present invention may be incorporated into other representative embodiments of an electronic trap suitable for use with the circuitry of the present invention, such as the diverter trap which is fully disclosed in the '899 patent and previously incorporated by reference.

The operation of the high-voltage, rearming circuitry of the present invention in conjunction with traps of the foregoing types will now be described with reference to FIG. 6, which illustrates a flow chart of the electrical circuit according to the present invention; FIG. 7 illustrates the same circuit in schematic form. The reference in FIG. 6 to a "mouse" as the subject pest is representative only and is intended to include all vermin to which the trap according to the present invention may be applied.

To commence operation of the trap, power is applied to the high-voltage output circuit 10, either from a battery or an electrical outlet. The unit is turned on, step 300, by a user using the switch 26, thereby placing the trap into an enabled condition. Upon entry into the enabled condition, the LED 28 flashes green once, step 302, and then turns off. The high-voltage output circuit 10 detects the battery status and, if the battery power is low, step 304, the LED flashes red one or more times, step 306, as a visual indicator to the user that the batteries should be replaced. Upon conclusion of the red LED flashing procedure, and also if the battery power is found to be sufficient in step 304, the unit remains in the enabled condition in a standby mode, step 308.

As an alternative indicator in the event of low battery power, the LED may flash red on a continuing and regular basis. If the trap includes only one LED, then green flashing thereof concurrent with the red flashing will change the output color of the LED to indicate to the user that both conditions are being reported. The red and green colors are provided by diodes of appropriate colors within the circuit.

The circuit 100 is triggered or activated, step 310, when a known impedance is sensed across the killing plates 18, 22. According to a preferred embodiment, the impedance resulting in activation of the circuit is 10K-1M ohms as a resistance level representative of a rat. Depending upon the resistors used to construct the circuit 10, other resistance levels could, of course, be implemented to suit the intended target animal.

Once activated, the circuit 10 delivers a high voltage pulse train to the killing plates 18, 22, 24; plates 18 and 22 are activated first, with the third plate 24 going live approximately 1 ms later. The high voltage pulses delivered to the killing plates are preferably delivered as spikes of approximately 7500V occurring every 4.25 ms over about a 120-second killing cycle, step 312. Upon completion of the killing cycle, current to the plates is terminated, and the battery level is checked, step 314. As before, if the battery power is low, step 314, the LED flashes red one or more times, step 316, as a visual indicator to the user that the batteries should be replaced. Upon conclusion of the red LED flashing procedure, and also if the battery power is found to be sufficient in step 314, the unit checks a stored trigger count, step 318, to determine if the circuit has been activated three times since entering the standby mode at step 308.

If the trigger count is equal to three, flashing of the green LED at a regular interval is initiated, step 320, and the unit does not reenter the enabled condition. Particularly, the LED flashes green once, checks to see whether 24 hours have elapsed, step 322 and, if 24 hours have not elapsed, repeats the flash and check cycle, steps 320 and 322. According to a preferred embodiment, the LED flashes green once every 5 seconds. When 24 hours have elapsed following the initiation of step 320, the unit is turned off, step 324.

If the trigger count is less than three, the unit checks for the continued existence of the target impedance across the plates, step 326, which indicates the continued presence of the mouse. If such resistance is still detected after 15 seconds, the unit initiates the regular flashing and checking cycle, steps 320, 322, to visually notify the user that the trap contains an electrocuted animal. The green flashing of the LED continues until the user services the trap or for a 24 period, step 322, whichever occurs first, after which the unit is turned off.

If there is no trigger resistance, step 326, i.e., an open circuit (static voltage) is sensed between the killing plates, the unit rearms to the enabled condition in standby mode, step 308, and thereafter awaits another rodent trigger. In this case, the LED does not illuminate, precluding the user from responding to a false-positive condition.

Figure 6:
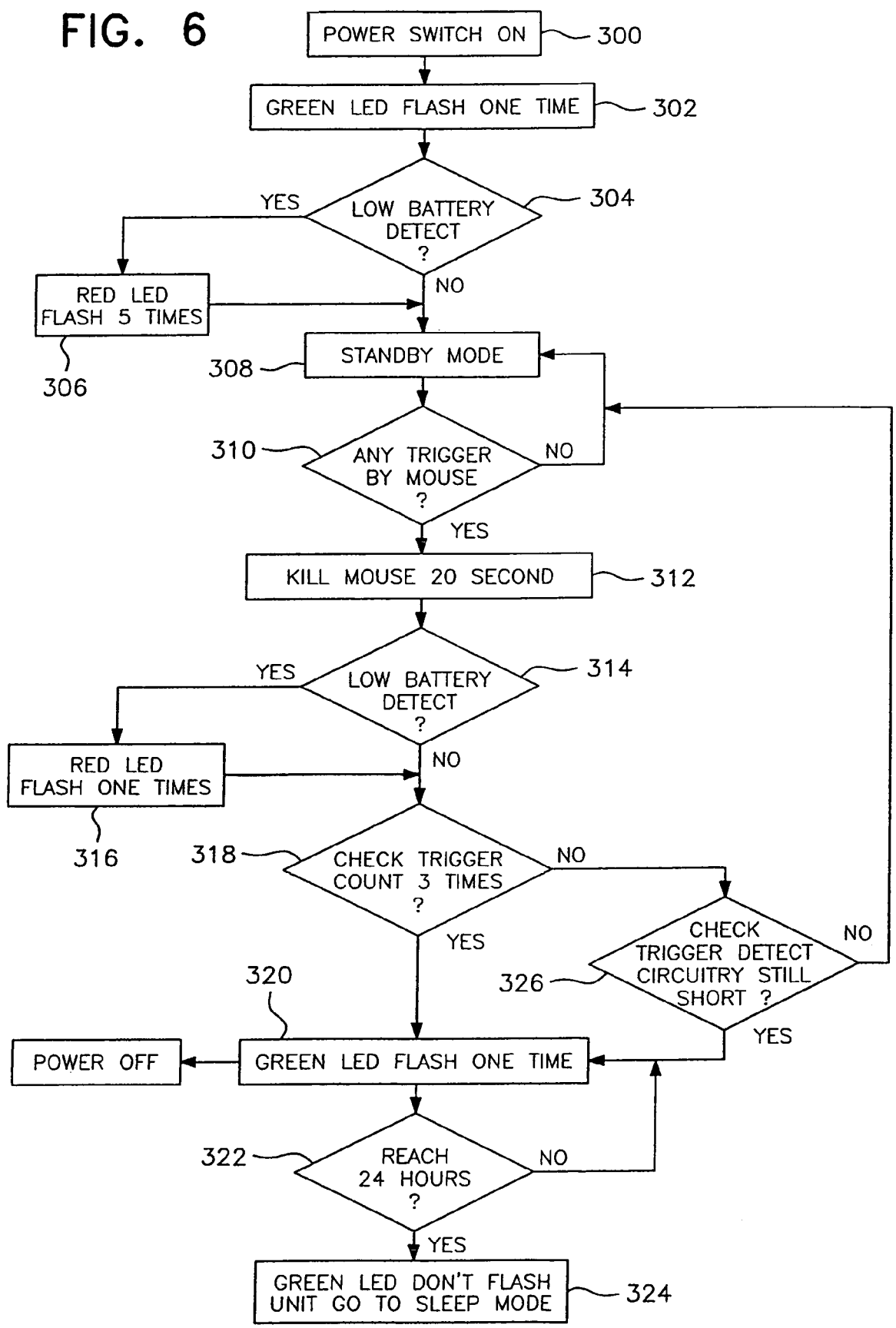
FIG. 6 is a flow chart of the high-voltage rearming electronic circuit according to the present invention.
Figure 7:
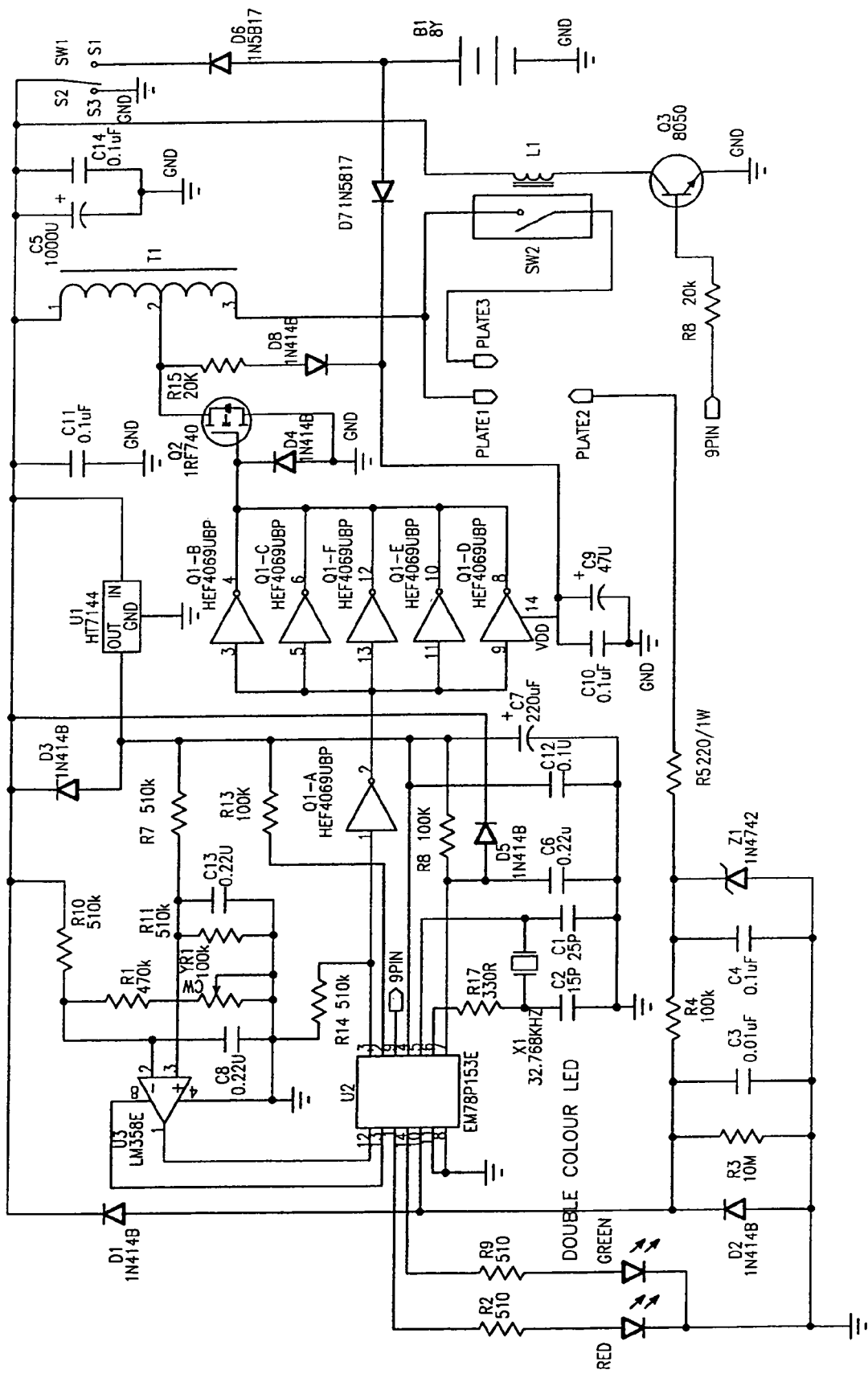
FIG. 7 is a schematic illustration of the high-voltage rearming electronic circuit with three-killing-plate configuration of the present invention.

According to the preferred embodiment as illustrated in FIG. 6, in the event that the presence of the rodent is not detected following the killing cycle, the circuit will rearm itself twice in the manner just described, preferably within five seconds of completing the killing cycle. Once the unit has been triggered three times, step 318, the flashing and rechecking cycle is entered, steps 320, 322, regardless of load impedance on the killing plates, followed by unit shut-down after 24 hours. As would be apparent to persons of skill in the art, the circuit may be designed to rearm a greater or fewer number of times before turning off, depending upon system and user requirements.

The foregoing is considered as illustrative only of the principles of the invention. Since numerous modifications and changes will readily occur to those skilled in the art, it is not desired to limit the invention to the exact construction and operation shown and described and, accordingly, all suitable modifications and equivalents may be resorted to, falling within the scope of the invention.

We claim:

1. An electronic pest trap comprising:
   a trap body having a power source and a mechanism for placing said trap into an active standby mode;
   a plurality of killing plates positioned within said trap body, said plurality of killing plates including first and second killing plates directly coupled to said circuit, and a third killing plate receiving said high-voltage pulse train via said first killing plate, said third plate being brought to a voltage level of said first plate up to approximately 1 msec after said first and second plates are activated by said high-voltage pulse train;
   a high-voltage automatic rearming circuit coupled to said killing plates, said circuit, with said trap in said active standby mode, automatically activating in response to detection of a pest body adjacent a pair of said killing plates such that said power source delivers a high-voltage pulse train through said circuit to said killing plates for a time period;

a processing unit configured to terminate current flow to said killing plates upon completion of said time period; and said circuit being configured to automatically rearm said trap to said active standby mode if a pest body is not detected adjacent said killing plates following termination of said current flow.

2. The electronic pest trap as set forth in claim 1, wherein said first killing plate is located farthest from said entrance within said trap body, and said second killing plate is located intermediate said first and third killing plates.

3. The electronic pest trap as set forth in claim 1, wherein said circuit is configured to detect the pest body by detecting simultaneous contact of said pest body with two of said killing plates.

4. The electronic pest trap as set forth in claim 2, wherein said circuit is configured to activate in response to detection of said pest body adjacent said first and second killing plates.

5. The electronic pest trap as set forth in claim 1, wherein said trap is configured to automatically rearm a plurality of times.

6. A method for exterminating a pest using an electronic pest trap having a high-voltage rearming circuit electrically coupled to a plurality of killing plates, said method comprising the steps of:

a) placing the trap into an active standby mode;

b) automatically activating said circuit upon detection of a pest positioned to be simultaneously contacting a pair of said killing plates;

c) delivering, by said circuit upon said automatic activation, a high-voltage pulse train of approximately 7500V about every 4.25 msec to said pair of killing plates for about 120 seconds;

d) checking, by said trap circuit, whether the pest is still positioned adjacent the pair of said killing plates after said specified time period; and e) automatically rearming said trap to said active standby mode upon failure to detect said pest.

7. The method as set forth in claim 6, wherein said plurality of killing plates includes first, second and third killing plates, said third killing plate adjacent an entrance to said trap, said first killing plate located farthest from said entrance within said trap body, and said second killing plate located intermediate said first and third killing plates, said pair of killing plates in step b) being said first and second plates.

8. The method as set forth in claim 6, wherein said plurality of killing plates includes first and second killing plates directly coupled to said circuit, and a third killing plate receiving said high-voltage pulse train via said first killing plate.

9. The method as set forth in claim 8, wherein said third killing plate is brought to a voltage level of said first killing plate approximately 1 msec after said high-voltage pulse train is delivered to said pair of killing plates.

10. The method as set forth in claim 6, wherein said step e) of automatically rearming can occur at least three times.

11. The method as set forth in claim 6, wherein said step d) is completed by detecting simultaneous contact of said pest with two of said killing plates.

12. An electronic pest trap comprising:

a trap body having a power source and side walls that define an elongated passageway leading from a trap entrance to a trap back wall;

a plurality of killing plates positioned within said trap body and adjacent one another in spaced relationship along said elongated passageway;

a high-voltage automatic rearming circuit coupled to said killing plates for delivering a high voltage pulse train, said plurality of killing plates including first and second killing plates directly coupled to said circuit, and a third killing plate receiving said high-voltage pulse train via said first killing plate, said third plate being brought to a voltage level of said first plate up to approximately 1 msec after said first and second plates are activated by said high-voltage pulse train;

said circuit, with said trap in an active standby mode, being configured to automatically activate when a pest is positioned to be simultaneously contacting a pair of said killing plates such that said power source delivers said high-voltage pulse train through said circuit to said killing plates; and said circuit being configured to automatically rearm said trap to said active standby mode in response to absence of a pest adjacent said pair of killing plates after delivery of said high-voltage pulse train.

13. The electronic pest trap as set forth in claim 12, wherein said third killing plate is adjacent said trap entrance, said first killing plate is located nearest said trap back wall, and said second killing plate is located intermediate said first and third killing plates.

14. The electronic pest trap as set forth in claim 13, wherein said circuit is configured to activate in response to detection of said pest body positioned to be simultaneously contacting said first and second killing plates.

15. The electronic pest trap as set forth in claim 14, wherein said circuit is configured to detect the pest body by detecting simultaneous contact of said pest body with said first and second killing plates.

16. The electronic pest trap as set forth in claim 12, wherein said trap is configured to automatically rearm a plurality of times.

* * * * *